March 10, 1959  W. L. COOK  2,876,966
POROUS AREA-SUCTION FLAP FOR AIRCRAFT
Filed July 25, 1955

INVENTOR
WOODROW L. COOK

BY
ATTORNEYS

United States Patent Office 2,876,966
Patented Mar. 10, 1959

2,876,966

POROUS AREA-SUCTION FLAP FOR AIRCRAFT

Woodrow L. Cook, Mountain View, Calif., assignor to the United States of America as represented by the Secretary of the Navy Application July 25, 1955, Serial No. 524,311

7 Claims. (Cl. 244—42)

(Granted under Title 35, U. S. Code (1952), sec. 266)

The invention described herein may be manufactured and used by or for the Government of the United States of America for governmental purposes without the payment of any royalties thereon or therefor.

The present invention relates to a porous area-suction flap and more particularly to a porous area-suction flap having a porous area at the leading edge upper camber and means to suck the boundary layer through the porous area.

The present day trend towards high speed aircraft, with speed in the range of Mach 1.0 and above, has dictated thinner wing sections, lower aspect ratios and more sweep-back, and these features have, in turn, necessitated more effective high-lift devices for low-speed flight, such as is encountered at take-off and landing. Previously used high lift devices which have been resorted to include plain flaps, slotted flaps, double-slotted flaps and Fowler flaps. However, these high-lift devices have not been as effective as is desirable, especially when used with high-speed type wings.

The present invention comprises a flap which has the upper camber leading edge area porous, and means to suck air through the porous area.

An object of the present invention is the provision of an improved high-lift device.

Another object is to provide an improved high-lift device having low power requirements.

A further object of the invention is the provision of an improved high-lift device suitable for use with high-speed wings, i. e., wings which are thin, are of low aspect ratios and which have relatively great sweepback.

Other objects and many of the attendant advantages of this invention will be readily appreciated as the same becomes better understood by reference to the following detailed description when considered in connection with the accompanying drawings wherein.

Figure 1:
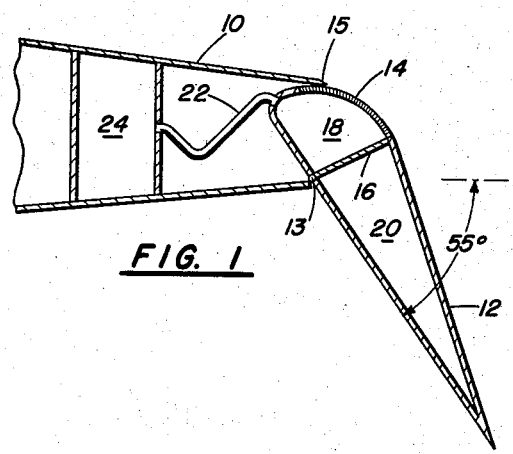
Fig. 1 is a sectional view of a flap and part of a wing made according to the invention.

Referring now to the drawings wherein like reference characters designate like or corresponding parts throughout the several views, there is shown in Fig. 1 the rear portion of a wing 10 with a flap 12 extending from the rear edge thereof, the flap 12 being deflected at an angle of 55°. The upper camber of the leading edge of the flap has a porous area 14 extending therealong. Aft of the area 14 is a dividing bulkhead 16 which separates the interior of the flap 12 into two compartments, compartment 18 being in the nose of the flap 12 and compartment 20 being aft of the bulkhead 16. A flexible tube 22 connects the compartment 18 to a duct 24 extending spanwise in the wing 10. Flap 12 is conveniently pivoted about a hinge 13. The trailing edge 15 of the upper surface of the wing 10 serves as a wiper to delineate the area 14.

Figure 2:
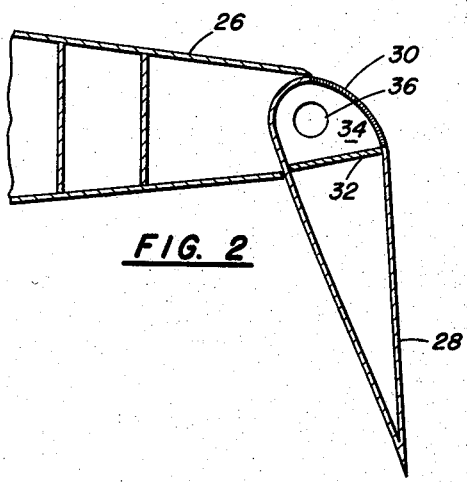
Fig. 2 is a view similar to Fig. 1 showing a second embodiment of the invention.

In Fig. 2 there is shown a wing 26 with a flap 28 extending from the rear edge thereof. The upper camber of the leading edge of the flap has a porous area 30 extending therealong. The porous area 30 is preferably a sintered porous stainless steel, and has the necessary rigidity and porosity. Aft of area 30 is a dividing bulkhead 32 which provides a compartment 34 in the nose of flap 28 under the porous area 30. In this case, suction is applied to compartment 34 by means of a conduit 36 connected directly to the compartment at its root end. The conduit 36 is concentric with the pivotal axis of the flap 28.

Figure 3:
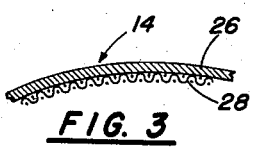
Fig. 3 is a detailed view of porous material usable for the flap.

Fig. 3 shows the porous material 14 which is preferably comprised of felt 26 and wire mesh 28. This construction also provides the necessary rigidity and porosity for the porous area 14.

In operation of the Fig. 1 embodiment, suction is applied to duct 24 which sucks air through tube 22, from compartment 18 and through the porous area 14. In Fig. 2, suction is applied to conduit 36 which sucks air from compartment 34, through porous area 30. Suction may be obtained from any convenient source, such as a centrifugal blower, driven by an electric motor in a chamber in the fuselage of the aircraft, or axial flow compressors, centrifugal compressors or ejection pumps operated by compressed air bled from the compressor of a jet engine. These systems have the advantage of obtaining large increases in flap-lift increment with small suction flow quantities. The air suction serves to prevent air-flow separation, hence, a high degree of flap effectiveness is realized.

Obviously many modifications and variations of the present invention are possible in the light of the above teachings. It is therefore to be understood that within the scope of the appended claims the invention may be practiced otherwise than as specifically described.

What is claimed is:

1. An air-foil, a flap for said air-foil, a porous area of substantial extent on the upper camber of the leading edge of said flap, and means to apply suction to said porous area, whereby air may be drawn through said porous area into the interior of said flap.

2. An air-foil, a flap pivotally attached to said air-foil, a porous area of substantial extent in the upper camber of the leading edge of said flap, a bulkhead in said flap hermetically dividing said flap into two compartments, one of which is beneath said porous area, and means to withdraw air from the compartment below said porous area and to thereby suck air into said compartment through the porous area.

3. An air-foil, a flap pivotally attached to said air-foil, a porous area of substantial extent in the upper camber of the leading edge of said flap, a bulkhead in said flap hermetically dividing said flap into two compartments, one of which is beneath said porous area, a spanwise duct in said air-foil, at least one tube connecting the compartment below said porous area with said duct, and means to suck air through said duct and tube.

4. The apparatus of claim 3, said porous area comprising a layer of felt and a wire mesh, said mesh supporting said felt.

5. An air-foil, a flap for said air-foil, a porous area of substantial extent on the upper camber of the leading edge of said flap, a hermetically-sealed chamber beneath said porous area, a conduit connected to said chamber at the root of said flap, and means to apply suction to said conduit whereby air may be drawn through said porous area, said chamber and said conduit.

6. The apparatus of claim 5, said conduit being concentric with the pivotal axis of said flap.

7. The apparatus of claim 5, said porous area comprising sintered stainless steel.

(References on following page)

References Cited in the file of this patent

UNITED STATES PATENTS

| | | |
|---|---|---|
| 2,469,902 | Stalker | May 10, 1949 |
| 2,511,504 | Hawkins | June 13, 1950 |

FOREIGN PATENTS

| | | |
|---|---|---|
| 504,747 | Great Britain | May 1, 1939 |

OTHER REFERENCES

N. A. C. A. Technical Note 3094; January 1954; p. 4.